United States Patent
Krinsky

(10) Patent No.: US 7,983,401 B1
(45) Date of Patent: Jul. 19, 2011

(54) CUSTOMIZED PROVISION OF AUTOMATED MENU OPTIONS

(75) Inventor: Jeffrey A. Krinsky, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1261 days.

(21) Appl. No.: 11/464,523

(22) Filed: Aug. 15, 2006

(51) Int. Cl.
*H04M 1/64* (2006.01)
*H04W 4/00* (2009.01)

(52) U.S. Cl. ..................... 379/88.23; 455/466

(58) Field of Classification Search ............... 379/88.01, 379/88.03, 201.02, 211.01, 211.02, 219; 455/466
See application file for complete search history.

(56) References Cited

U.S. PATENT DOCUMENTS

| | | | |
|---|---|---|---|
| 5,434,906 A | | 7/1995 | Robinson et al. |
| 6,061,433 A | * | 5/2000 | Polcyn et al. ............... 379/93.12 |
| 6,314,165 B1 | | 11/2001 | Junqua et al. |
| 6,324,263 B1 | | 11/2001 | Sherwood et al. |
| 6,671,670 B2 | | 12/2003 | Levin et al. |
| 6,829,335 B2 | | 12/2004 | Colemon |
| 6,947,539 B2 | * | 9/2005 | Graham et al. ............... 379/219 |
| 7,012,996 B2 | * | 3/2006 | Polcyn .................. 379/88.01 |
| 7,065,188 B1 | * | 6/2006 | Mei et al. ................. 379/88.23 |
| 7,194,409 B2 | * | 3/2007 | Balentine et al. .............. 704/253 |
| 2002/0057768 A1 | * | 5/2002 | Polcyn .................. 379/88.01 |
| 2003/0004820 A1 | | 1/2003 | Clifton et al. |
| 2003/0198321 A1 | * | 10/2003 | Polcyn .................. 379/88.01 |
| 2005/0152511 A1 | * | 7/2005 | Stubley .................. 379/88.01 |
| 2006/0215831 A1 | * | 9/2006 | Knott et al. .............. 379/211.02 |
| 2007/0073719 A1 | * | 3/2007 | Ramer et al. .................. 707/10 |
| 2007/0100650 A1 | * | 5/2007 | Ramer et al. .................. 705/1 |

* cited by examiner

*Primary Examiner* — Davetta W Goins
*Assistant Examiner* — Mohammad Islam

(57) ABSTRACT

A system for utilization in connection with an automated telephone attendant comprises a recognizer component that determines information associated with a caller, such as identity of the caller, that is connected with the automated telephone attendant. An organization component dynamically determines which menu options to provide to the caller and an order of the menu options based at least in part upon the determined information associated with caller.

22 Claims, 12 Drawing Sheets

CUSTOMIZED PROVISION OF AUTOMATED MENU OPTIONS

BACKGROUND

To provide adequate support to current or prospective customers, many businesses offer telephone numbers that individuals can call for such support. For example, these customer service numbers can be utilized to pay bills, receive technical support, purchase products or services, cancel or change services, update user information such as an address, and various other tasks. In the past, these numbers routed to a plurality of lines, wherein human beings were employed to personally answer telephones, answer questions, and route phone calls. Access to these telephone lines, however, was typically limited to business hours, as it is extremely expensive to employ individuals to monitor phones for twenty hours a day, seven days a week. This is problematic for customers or prospective customers who have a small time window within which they can make telephone calls. For instance, if an individual has a technical question regarding a television, yet must be at a place of employment at a subtantially similar time that the customer service line is available, it may be difficult at best to ask appropriate questions or take action while not proximate to such television.

As technology with respect to the telecommunications industry has advanced, automated telephone attendants have become a well-known tool for use in connection with customer service telephone lines. These automated attendants enable businesses to offer twenty-four hour support on several topics that are deemed most important by the businesses. For example, customer support telephone lines associated with large banks typically allow a user, through use of an automated attendant, to check account balances, transfer monies between accounts, make payments on loans with a bank, and other common tasks. Generally, users can provide feedback to the automated attendant and/or make selections by generating voice commands or depressing particular buttons on a touch-tone telephone. In other words, callers can traverse through a menu by providing feedback to questions or listed options provided by the automated attendant. If the automated attendant is not able to provide the particular support desired by the user, such user can then be transferred to a human being for further assistance.

While automated telephone attendants have enabled businesses to reduce overhead cost and, in some instances, provide efficient customer support, there are many instances where callers to the customer support line can become frustrated. For instance, a caller may have to listen to several options that are not germane to the caller's desires with respect to customer support. Thus, callers to customer support lines can find themselves provided with a seemingly endless parade of options, and the caller can spend a significant amount of valuable time on the telephone traversing through these options. Such "wasted" time can leave the caller with feelings of angst towards the company utilizing the automated attendant. Additionally, company costs can be increased, as companies typically offer toll free numbers for users to contact for customer support, wherein charges for time callers spend with the automated attendant are bore by the companies.

SUMMARY

The following presents a simplified summary in order to provide a basic understanding of some aspects of the subject matter disclosed herein. This summary is not an extensive overview, and it is not intended to identify key/critical elements of the disclosed subject matter or to delineate the scope thereof. Its sole purpose is to present some concepts in a simplified form as a prelude to the more detailed description that is presented later.

The subject matter described in greater detail below relates to dynamic and automatic provision of menu options that are ordered in a customized manner based at least in part upon information associated with a caller that is connected with an automated telephone attendant. In more detail, data relating to a caller can be collected over time, wherein such data is indicative of which menu items to provide to the caller as well as an order that the menu items should be provided to the caller. In contrast, conventional automated telephone attendants provide identical menu options in identical orders regardless of caller history, caller preferences, and/or the like.

To improve user experience with respect to automated telephone attendants, data that may be relevant in determining preferences of the user with respect to menu options can be collected (e.g., through use of a collection component) and analyzed. Pursuant to an example, a caller can explicitly provide preferences with respect to menu options by way of a web browser, through phone commands, and/or the like. Thereafter, when the caller dials a phone number associated with the automated telephone attendant, menu options will be provided to the caller in accordance with the explicitly provided preferences. For instance, the caller can be identified through analysis of caller identification information, voice analysis, username, account number, password, personal identification number, and/or the like. Once the caller has been identified (or demographic information has been determined), preferences associated with the caller can be quickly accessed and menu options can be provided to the caller in a particular order.

Additionally, menu options can be pre-programmed such that particular options are provided to callers with certain parameters associated therewith. Pursuant to an example, callers associated with a first area code may always be provided with certain menu options in a particular order while callers associated with a second area code may be provided with different menu options (in a different order). Other identifying indicia can be analyzed in a phone number (such as an exchange) can be utilized to determine a user's location. Such pre-programmed provision of menu options can be based upon various parameters, such as age of callers, location of callers, whether a caller is an employee or a customer, device type being utilized to make a call, etc.

Moreover, data relating to numerous callers that have utilized an automated telephone attendant can be retained and analyzed through use of machine-learning techniques to infer preferences of callers or groups of callers with respect to an automated telephone attendant. Thus, inferred or explicitly provided preferences of related and/or similar callers (e.g., similar with respect to demographic information) along with caller history can be leveraged in connection with inferring preferences of a particular caller. As more data is collected, more intelligent decisions can be made regarding which menu options to provide to callers as well as an order of such menu options.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become

DETAILED DESCRIPTION

Figure 1:
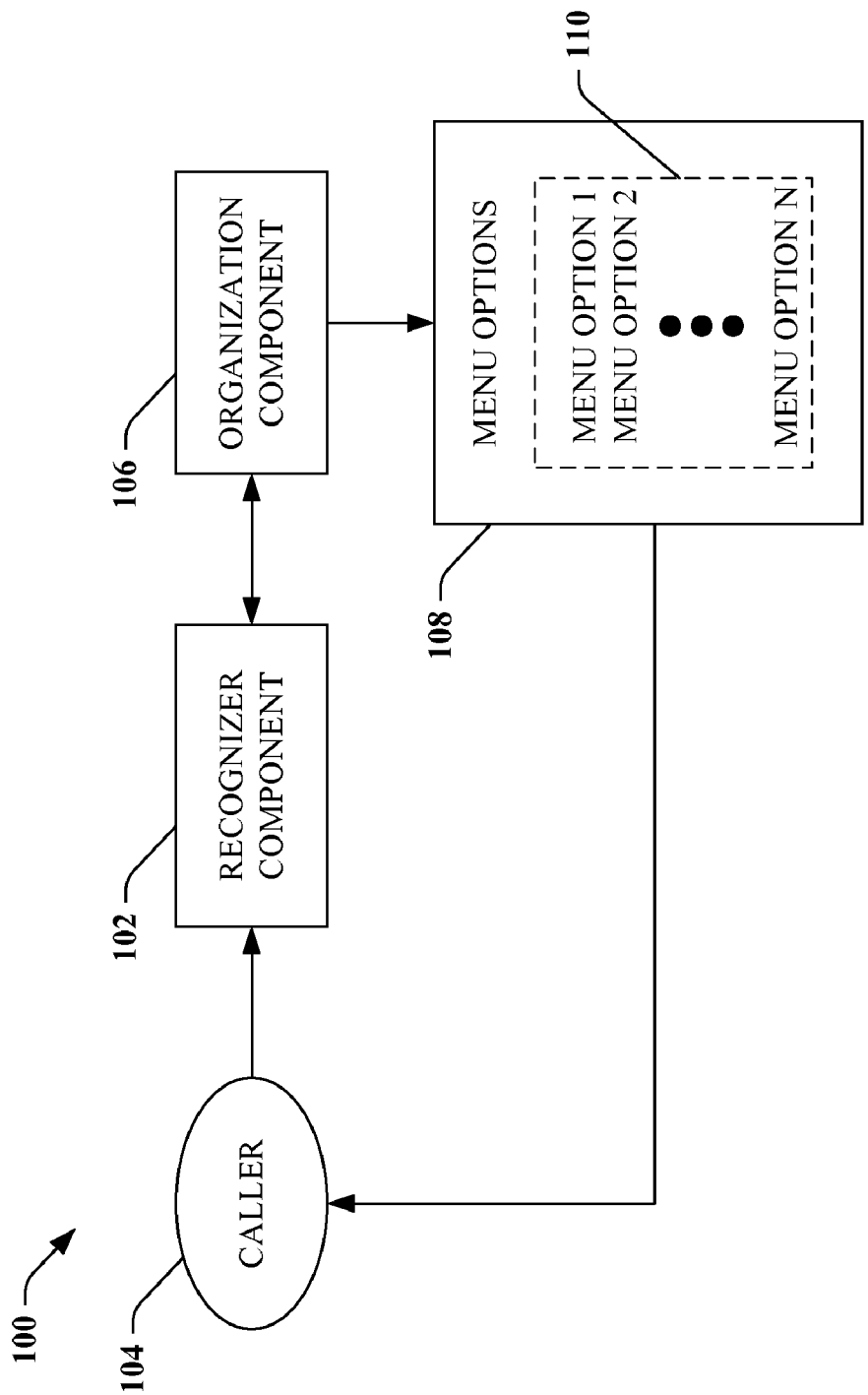
FIG. 1 is a high level block diagram of a system for automatically determining which menu options to provide to a caller and determining an order of the menu options to provide to the caller, wherein the determinations are based at least in part upon information associated with the caller (such as identity of the caller).

The disclosed subject matter is now described with reference to the drawings, wherein like reference numerals are used to refer to like elements throughout. In the following description, for purposes of explanation, numerous specific details are set forth in order to provide a thorough understanding of the subject matter described herein. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, magnetic storage, or other suitable storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computing device to implement the disclosed subject matter. The term "article of manufacture" as used herein is intended to encompass a computer program accessible from any computer-readable device, carrier, media, network interface, Internet, etc. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, it can be recognized that many modifications may be made to this configuration without departing from the scope or spirit of the disclosed subject matter.

Turning now to the drawings, FIG. 1 illustrates a system 100 that provides a caller to a customer service line with menu options that are in a customized order, thereby reducing an amount of time that the caller must be on the telephone. The system 100 includes a recognizer component 102 that can recognize information associated with a caller 104 to a customer service line. Such information can include location of the caller 104, demographic information associated with the caller 104, identity of the caller 104, etc. For instance, the caller 104 can be calling for technical support, to pay a bill, to purchase an item or service, etc. Additionally, the caller 104 can be a recipient of a call from an automated attendant (rather than actively calling an automated attendant). Conventionally, the caller 104 is provided with a plurality of menu options in a predefined order, wherein some menu options may be nested, such that for the caller 104 to reach a desired menu option such caller 104 must listen to a plurality of menu options that are often unrelated to the caller's purpose for contacting customer service. The system 100 overcomes some of these deficiencies by providing the caller 104 with certain menu options that are in a customized order, wherein the caller 104 can predefine the menu options and order, the menu options and order can be inferred given knowledge of parameters associated with the caller 104 and other users of the system 100, a combination thereof, etc.

As stated above, the recognizer component 102 can, upon receipt of a call, determine an identity of the caller 104 through, for example, analysis of information within a caller identification line and/or utilization of voice analysis techniques. Still further, the recognizer component 102 can request and analyze personal identification numbers, account numbers, usernames, passwords, biometric indicia (such as fingerprint data obtainable through a scanning mechanism), and other suitable information that can be utilized to identify the caller 104. Additionally, the recognizer component 102 can utilize any combination of the aforementioned techniques in connection with discerning identity of the caller 104.

Moreover, the recognizer component 102 can receive/ascertain other information from the caller 104, such as a type of phone that the caller 104 is employing to contact the customer service number, location of the caller 104, and other suitable information. The recognizer component 102 relays information about the caller to an organization component 106, which outputs one or more menu options 108, wherein the menu options 108 can include a plurality of menu options 110 that are customized based at least in part upon the information. If the caller 104 has not utilized the system 100 previously, the organization component 106 can provide the caller 104 with default menu options in a default order (or use other information, such as location, to determine menu options and order thereof).

To determine which menu options to provide to the caller 104 and in what particular order, the organization component 106 can, for instance, utilize a rules-based (pre-programmed) approach. For example, upon receiving the identity of the caller 104, the organization component 106 can know which menu options to provide to the caller 104 and in what order to provide the menu options. This knowledge can be based upon preferences explicitly provided by the caller 104 (e.g., through a web interface, through voice commands, a conversation with a human operator, . . . ), for instance. Rules can also be automatically initiated given certain caller parameters, such as caller age, caller location, etc. For example, rules can exist with respect to female callers who are between thirty and forty years old and calling from a particular location. Additionally or alternatively, the organization component 106 can analyze caller history, caller context, and other user-centric data and perform a statistical analysis to determine most likely preferences of the caller 104 with respect to menu options provided by an automated telephone attendant. For example, based upon previous calls, it can be determined that statistically a user is likely to desire a particular menu option with a calculated amount of certainty. Still further, the organization component 106 can have access to and analyze historical user data and preferences together with historical data and preferences associated with related or similar callers, and can infer specific menu options and/or order of menu options to provide to the caller 104.

As used herein, the term "inference" refers generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For instance, based upon a caller's previous menu selections, time of the call (including time of the month), demographic information associated with the caller, and device the user is calling from, menu options and order thereof can be inferred by the organization component 106 and provided to the caller 104.

Pursuant to an example, a menu provided by a conventional automated telephone attendant can be structured to first present three menu options, such as an option for technical support, an option for purchasing services, and an option for paying monthly bills. Upon selection of one of these options, several other options can be provided to the caller 104. For example, if the caller 104 selects the option to pay monthly bills, an option for paying by debit card and an option for paying by credit card can be provided to the caller 104 (in that order). If the caller 104 selects the option to pay by credit card, options relating to credit card type can be provided. Thus, if the caller 104 simply wishes to pay their bill by a particular credit card, they must nevertheless traverse through a plurality of menu options, many of which are unrelated to the caller's purpose for dialing a number for customer service. In contrast, the organization component 106 can analyze explicitly provided information and can output menu options to the caller 104 based upon such information. Additionally or alternatively, the organization component 106 can infer what menu options to provide to the caller 104 given certain data. For instance, the organization component 106 can initially provide the caller with an option to pay a bill by way of a particular credit card as well as an option to be provided with a main (default) menu. Thus, rather than being forced to wade through several non-relevant options, the caller 104 can be quickly provided with highly relevant menu options.

While the above and foregoing describes providing optimal menu options through use of an automated telephone attendant, it is to be understood that concepts described herein can be utilized in other arenas (e.g., wherever menu options are employed). For instance, menu options at a drive through restaurant can be provided to an individual based upon the individual's identity and/or a parameter associated with the individual (such as age of the individual, type of vehicle the individual is using, etc.). More particularly, menu options can be provided and ordered through analysis of user history, context, demographic information, time of day, day of week, and other factors. In another example, a vending machine can provide digital options based upon known or inferred user preferences. In these provided examples, a portable telephone or other suitable device can relay information about the user through use of a near-field communications protocol, for instance, and the menu options can be selectively provided based at least in part upon information provided through use of the portable device.

Still further, menus on Internet pages can be selectively provided to a user such that menu options the user is most likely to prefer are displayed prominently while menu options the user is least likely to prefer are displayed less prominently or hidden. Such determination can be made for various levels of menu options. Additionally, advertising content can be provided, wherein the advertising content can correspond to menu options that are most likely preferred by the user. In still another example, menus provided by automated teller machines can be automatically provided and arranged based at least in part upon parameters associated with a user and/or user identification. These examples are provided to illustrate possible scope of the systems/methods described herein, and are not intended to be limitative.

Figure 2:
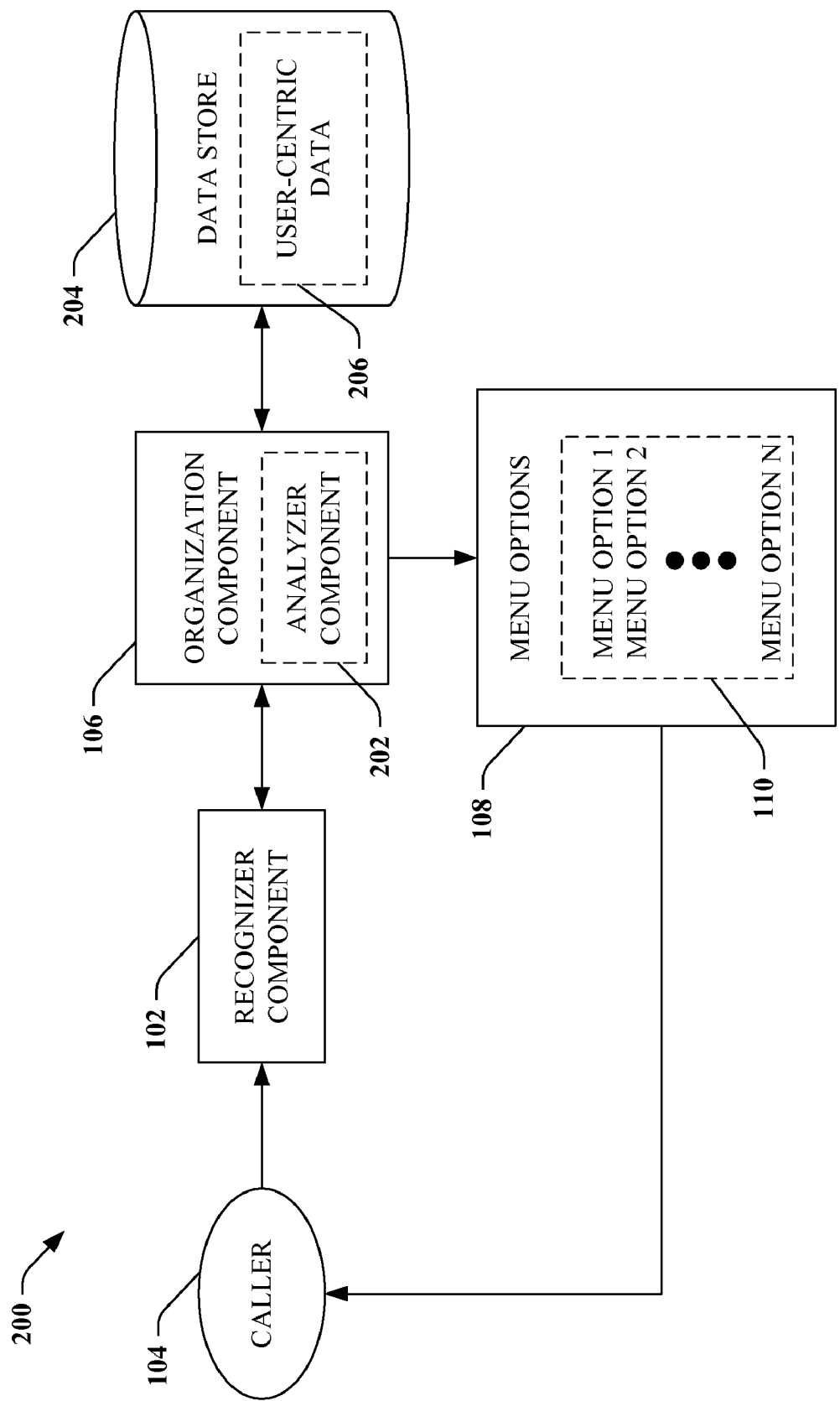
FIG. 2 illustrates a system for analyzing user-centric data in connection with determining which menu options (and an order thereof) to provide to a caller.

Now referring to FIG. 2, a system 200 that can be utilized in connection with an automated telephone attendant to selectively provide menu options and structure(s) to callers is illustrated. The system 200 includes a recognizer component 102 that receives a call from the caller 104 (or initiates a call to the caller 104), wherein the caller 104 is in contact with a number for customer service/support. The recognizer component 102, upon being connected to the caller 104, can ascertain information related to the caller 104 (such as identity, age, location, etc.), wherein such ascertainment can be accomplished through any suitable means. The ascertained information can be relayed to an analyzer component 202 that is associated with the organization component 106, and the analyzer component 202 can access a data store 204 that includes user-centric data 206. For instance, the user-centric data 206 can include specific requests for menu options and/or structures provided by the caller 104. Therefore, once the information of the caller 104 is determined, the analyzer component 202 can quickly determine what menu options 110 to provide to the caller 104 and an order of such menu options 110.

The caller 104 can (through any suitable communications medium) provide information to the data store 204 regarding menu option preferences, which can be fairly granular. Pursuant to an example, the caller 104 can state that they would like to be provided with an option to pay a bill by way of a certain credit card if they call the customer service line within three days of an end of a billing cycle. Thus, the caller 104 can generate rules that can be retained within the data store 204 and utilized by the organization component 106 when the caller 104 is identified by the recognizer component 102. Absent explicitly provided rules, the analyzer component 202 can review the user-centric data 206 and make probabilistic determinations based at least in part upon such data 206. For instance, the analyzer component 202 can determine that three out of the last four times the caller 104 has utilized the automated telephone attendant, such caller 104 has traversed through certain menu options. The analyzer component 202 can thus infer that the caller 104 is likely to utilize the menu options that were historically selected by the caller 104, and the organization component 106 can output the menu options 110 to reflect such inference.

Still further, the analyzer component 202 can undertake a more granular and robust analysis of the user-centric data 206, which can include information such as type of phone, call history, times of day, days of week, times of a month, etc. that the caller 104 utilizes the automated telephone attendant, weather conditions, whether a day is a holiday, service-specific data, such as services utilized or purchased by the caller 104, products owned by the caller 104, and various other information. The analyzer component 202 can then reason over such data given certain contextual data and dynamically determine optimal menu options for the caller 104. The organization component 106 can utilize various techniques/systems in connection with determining and outputting customized menu options to the caller 104, such as Bayesian networks, artificial neural networks, Support Vector Machines, decision trees, quadratic classifiers, a k-Nearest Neighbor approach, and any other suitable machine-learning technique/system.

Figure 3:
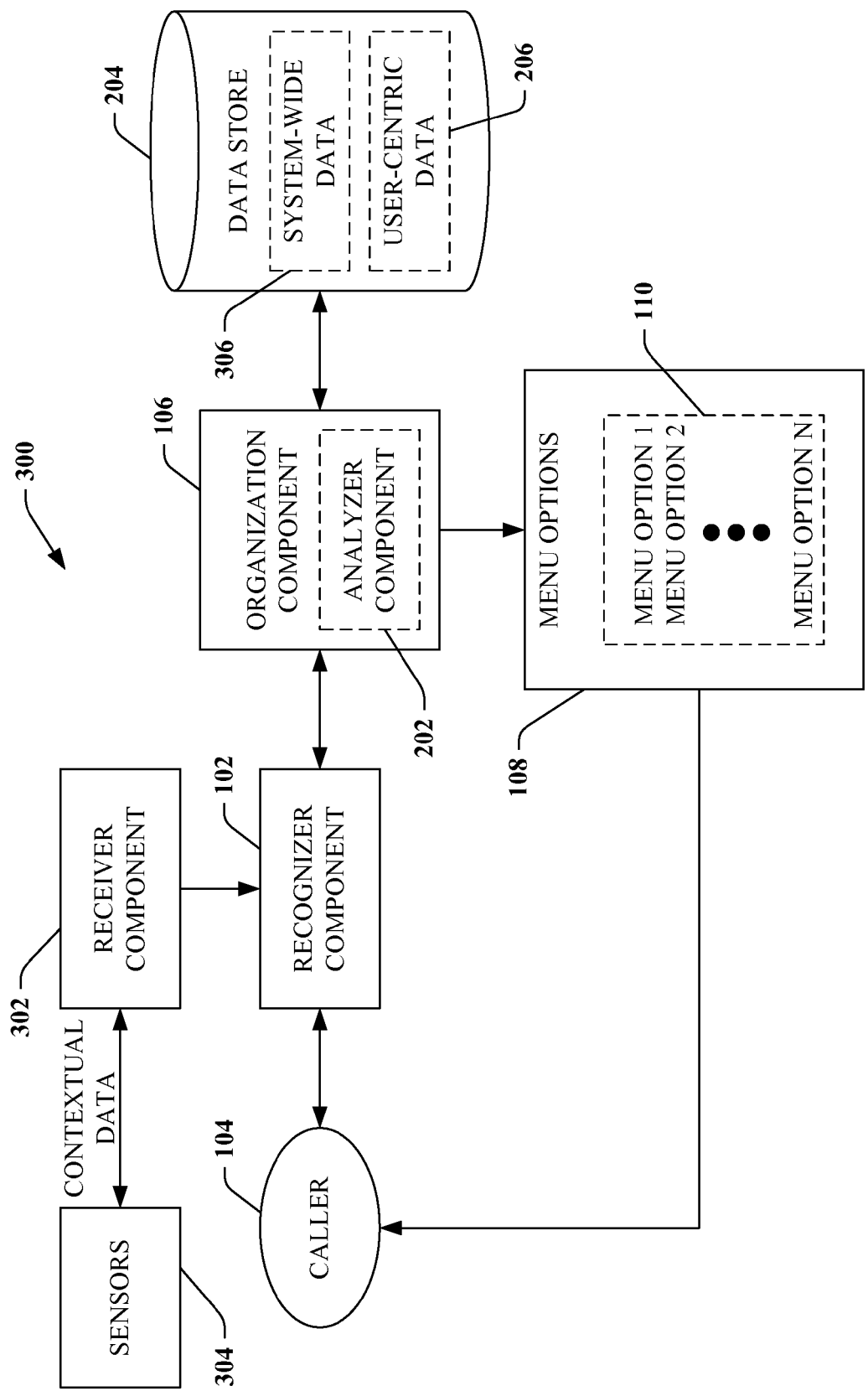
FIG. 3 is a system that facilitates determination of optimal menu options to provide to a caller that dials a number associated with an automated telephone attendant.

With reference now to FIG. 3, a system 300 that can be utilized in connection with an automated telephone attendant to provide customized menu options to particular callers into a customer service line is illustrated. The system 300 includes the recognizer component 102, which can determine an identity of the caller 104 (or other parameters such as location of the caller 104) when the caller 104 utilizes the customer service/support telephone line. In an example, the recognizer component 102 can review an IP address, RFID, SIM card, etc. associated with a computer utilized to make the call (since Voice Over IP is becoming a frequently utilized protocol to make phone calls). The system 300 can also include a receiver component 302 that receives contextual information from one or more sensors 304, wherein the sensors 304 can be internal to a telephone utilized by the caller 104 and/or external to the telephone. Examples of data that can be received by the receiver component 302 (and sensed by the sensors 304) include temporal data, weather conditions, current web page that the user is accessing while making the call, type of device utilized by the caller 104, location of the caller 104, problems within a system (e.g., a network is down), and other data that can be sensed in real-time. This data together with the caller's identity can be provided by the recognizer component 102 to the organization component 106, which can access the data store 204 and provide customized menu options 108 to the caller 104.

In more detail, the analyzer component 202 can access the data store 204 and review the user-centric data 206 together with system-wide data 306 to ascertain an order that menu options are to be provided to the caller 104. For example, the system-wide data 306 can be partitioned by demographics to aid in determining an order of menu options with respect to the caller 104. For instance, if the customer service line is offered by a wireless communications company and the caller 104 is a teenager in a metropolitan area, it may be likely that the caller 104 wishes to purchase one or more ring tones (wherein such likelihood can be determined through analysis of the system-wide data 306). In contrast, if the caller 104 is an executive in their sixties, it is unlikely that such caller 104 will wish to purchase ring tones (as can be discerned through analysis of the system-wide data 306). Thus, the analyzer component 202 can access and analyze (through use of machine learning techniques) a combination of the user-centric data 206 and the system-wide data 306 to output probabilistically determined or inferred menu options and order thereof.

The organization component 106 can also provide other information besides menu options to the caller 104. For instance, if the caller 104 needs to speak with a human being and is placed on hold, the organization component 106 can review explicitly provided preferences or inferred preferences regarding a type of music that the caller 104 will most like to hear while on hold. Thus, the caller 104 will not be frustrated by listening to music that does not correlate with their musical tastes while on hold.

Figure 4:
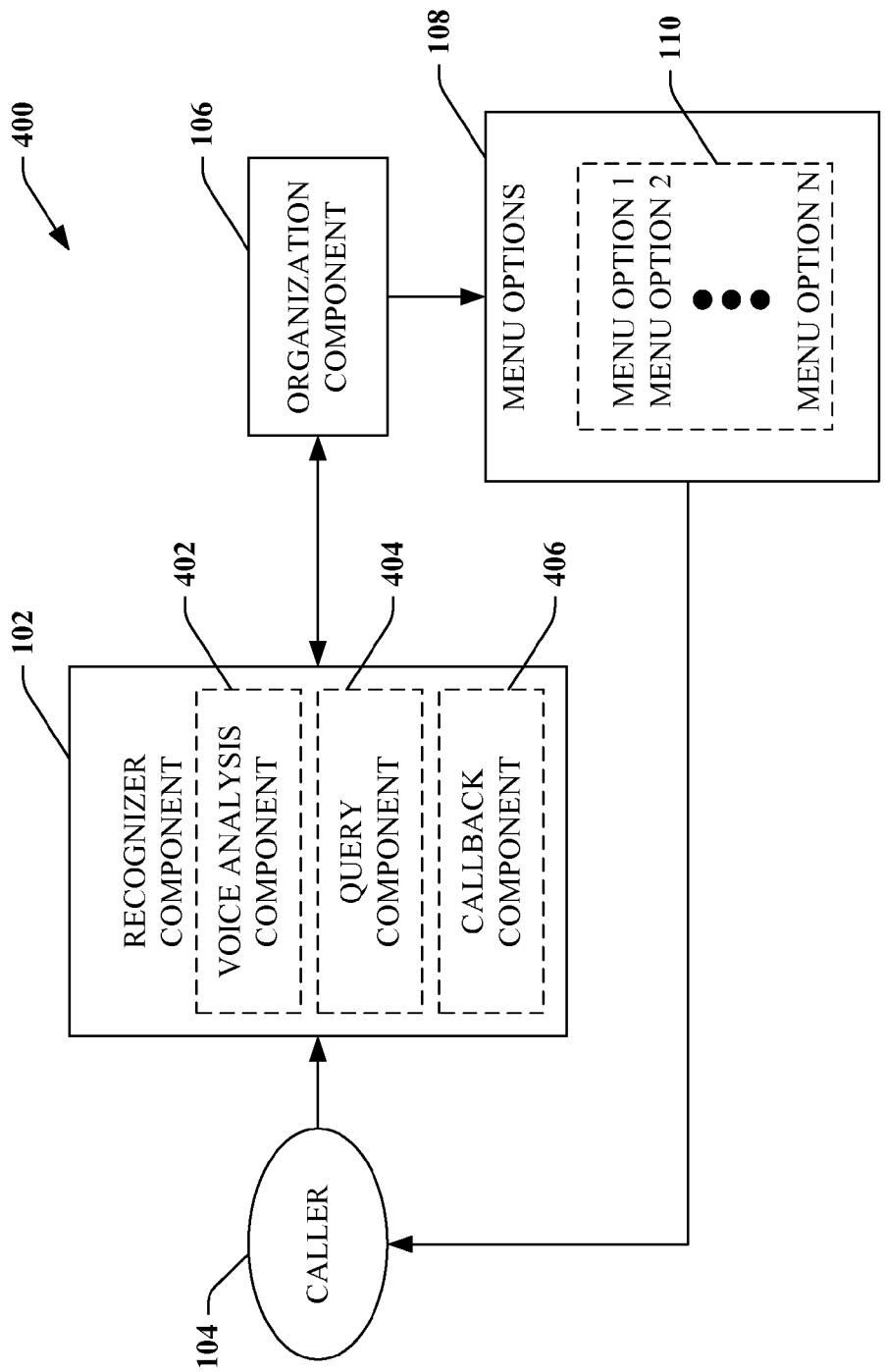
FIG. 4 illustrates a system for determining an order of menu options to provide to a caller to a customer support line based at least in part upon a determined identity of the caller.

Referring now to FIG. 4, a system 400 for utilization in connection with an automated telephone attendant is illustrated. Components of the system 400 can be initiated when the caller 104 is connected with customer service/support line. The system 400 includes the recognizer component 102, which can be employed to recognize an identity of the caller 104 and/or other suitable information related to the caller (such as location, device being used by the caller, etc.). For instance, the recognizer component 102 can include a voice analysis component 402, which can analyze a voice sample from the caller 104 to discern an identity of such caller 104 (amongst a plurality of other possible identities). The recognizer component 102 can utilize the voice analysis component 402 in connection with other data to reduce a set of possible identities, such as a phone number of the caller 104, a geographic location of the caller 104, and the like.

Additionally or alternatively, the recognizer component 102 can include a query component 404, which can query the caller 104 for information such as a username, password, account number, or other suitable information that can be utilized to determine an identity of the caller 104. For instance, when the recognizer component 102 receives the call, the query component 404 can generate an audible request for identifying indicia from the caller 104. The query component 404 can then receive a response from the caller 104 and authenticate an identity of the caller 104 based upon the response. For example, the query component 404 can access a database (not shown) that enables such component 404 to authenticate an identity of the caller 104. The recognizer component 102 can additionally be associated with a callback component 406, which can identity the caller 104 by automatically calling the caller 104 on a particular number. Furthermore, it can be understood that two or more of the components 402-406 can operate in conjunction to quickly discern an identity of the caller 104.

Once the recognizer component 102 has identified the caller 104 and/or received other information related to the caller 104, the organization component 106 can output particular menu options in a specific order to the caller 104, wherein the menu options and order thereof are customized based upon explicitly provided or inferred preferences of the caller 104. Therefore, two different callers with different purposes for calling a customer service line can be provided with non-similar menu options in distinct orders.

Figure 5:
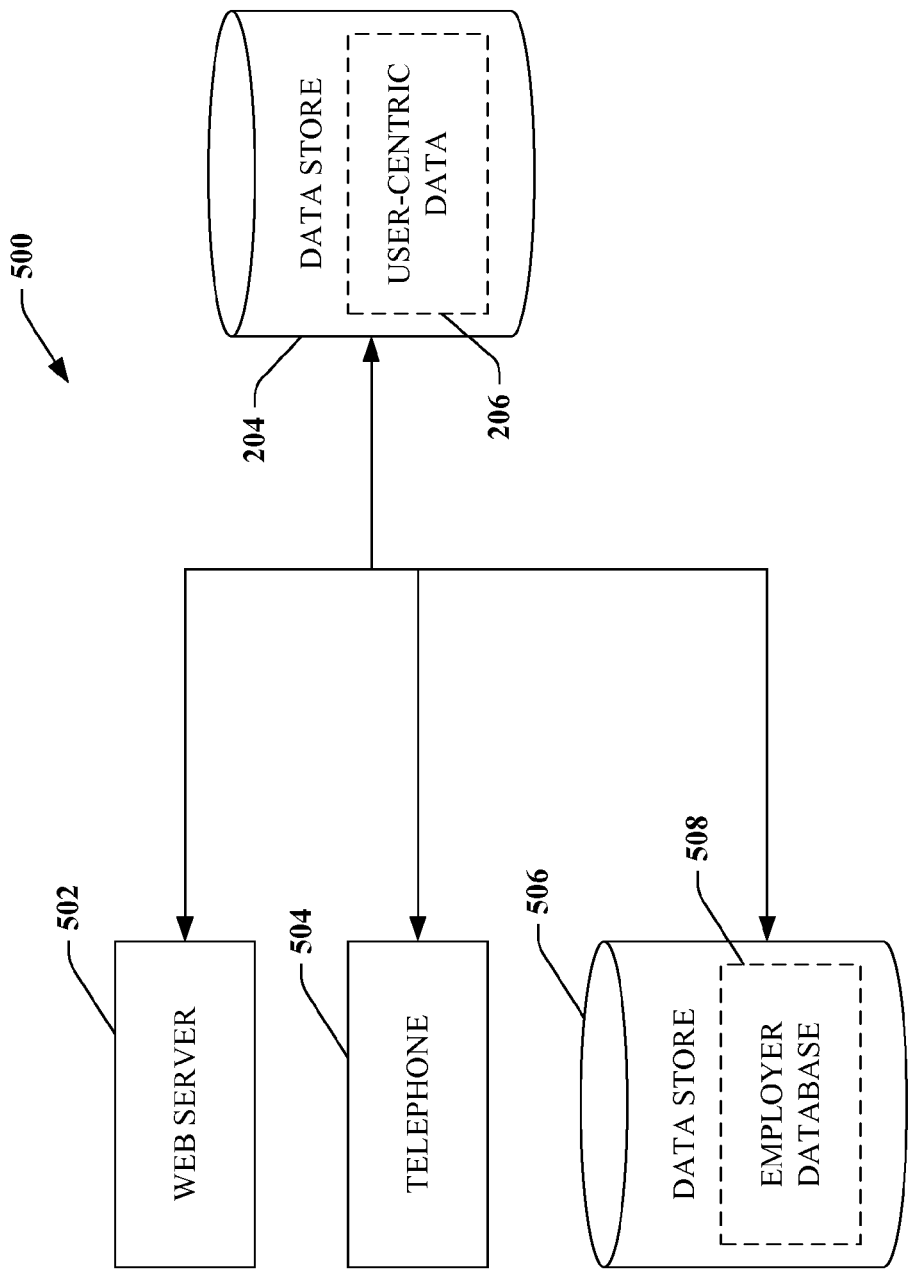
FIG. 5 illustrates a plurality of data sources that can be utilized in connection with determining which menu options to provide to a caller to an automated telephone attendant as well as an order of menu options to provide to the caller.

Now turning to FIG. 5, a system 500 is provided that illustrates various sources of data that can be utilized in connection with an automated telephone attendant. For instance, the data store 204 can include the user-centric data 206, which can include data from a web server 502. Pursuant to an example, a caller can utilize a browser (or other suitable application) to provide preferences regarding menu options, order of menu options, music or "comfort noises" to be provided to the caller while on hold, and the like. This information can then be pushed by a user (e.g., through depressing a "submit" button) to the web server 502. Other components (not shown) can then be employed to transition such data to the data store 204. Still further, the web server 502 can include other information relating to the user, such as web pages visited, queries provided to search engines, and the like. Such information can prove useful in determining why the user is contacting a customer service number; for instance, a user may query for technical information relating to a device, and can soon thereafter contact the customer service line. It can be inferred that the user may wish to receive aid with respect to a technical aspect of the device (rather than pay a bill).

A telephone 504 that is owned by the caller can also be a source of data. For instance, location of the caller can be tracked over time if the telephone 504 is associated with location-tracking abilities (e.g., the telephone is GPS-enabled). Additionally, the telephone 504 can transmit information such as time information, what time zone the caller is residing within or has traveled through, and/or the like. Still further, a data store 506 that includes an employee database 508 can be a source of information that can be retained within the data store 204. For example, a caller that is an employee of a company offering a support line will likely desire different menu options than a caller that is not an employee of the company. In another example, whether an employee is in a first department versus a second department can be associated with different preferences regarding menu options (e.g., customer service versus engineering). This data, for instance, can be retained within the user-centric data 206 of the data store 204. Additionally, with respect to other callers, the data may be associated with the system-wide data 306. The data sources 502-506 illustrated are just examples of possible sources of data that can be utilized to improve automated telephone attendants, and other sources are contemplated by the inventor and intended to fall under the scope of the hereto-appended claims.

Figure 6:
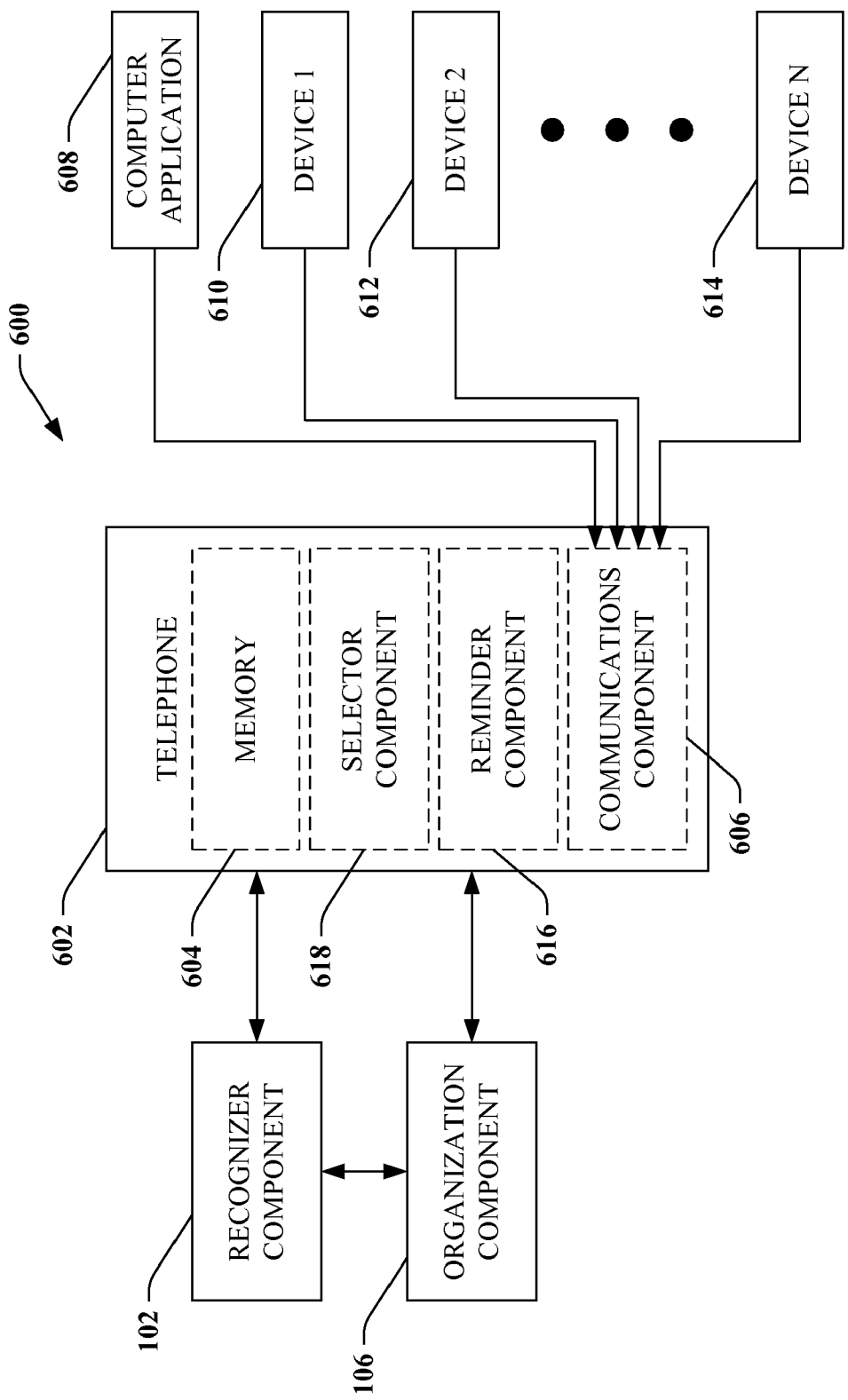
FIG. 6 is a system for generating a data packet that includes metadata, wherein menu options are provided to a caller based at least in part upon contents of the data packet.

With reference to FIG. 6, a system 600 is illustrated that facilitates improvement of automated telephone attendants. The system 600 includes a telephone 602 that includes memory 604, wherein the memory 604 can comprise correlations between devices and/or services with customer service numbers. The telephone 602 can be a headset that is connected to a computing device, a conventional telephone, a cellular telephone, and/or the like. The telephone 602 can also include a communications component 606, which can communicate with one or more computer applications 608 and a plurality of devices 610-614. Given the increasing amount of connectivity and advanced communications protocols (such as Bluetooth), the telephone 602 can exchange data with a computer as well as other suitable devices. For instance, the computer application 608 can be a calendar application that includes reminders for calling customer service lines to pay bills or for other technical support. Pursuant to another example, the device 610 can be a self-diagnosing automobile that can inform the telephone 602 when an oil change is necessary. Similarly, the device 612 can be a self-diagnosing home appliance, such as a dishwasher, which can communicate with the telephone 602 by way of the communications component 606 and a particular near field protocol. In still another example, the device 614 can be a television that can communicate with the telephone 602.

The telephone 602 can also include a reminder component 616 that provides a reminder to a user of the telephone 602 based upon a calendar entry, for instance. The reminder component 616 can provide a reminder to a user of the telephone 602 that a particular customer service number needs to be contacted to perform a task that is associated with the reminder. In another example, the device 610 can be a self-diagnosing automobile which can communicate to the telephone 602 by way of the communications component 606 that an oil change is needed, for instance. The reminder component 616 can then provide an indication to a user of the telephone 602 that a customer service line needs to be dialed to schedule an oil change. A selector component 618 can be employed to select a customer service number associated with the device 610. For example, if the device 610 diagnoses itself and determines maintenance is required, the device 610 can inform the telephone through the communications component 606, and the selector component 618 can locate a phone number associated with the device (stored in the memory 604).

The user of the telephone 602 can then depress one or more buttons or provide voice commands to the telephone 602 to initiate a call to the appropriate customer service number. The recognizer component 102 can recognize an identity of the caller by analyzing a caller identification line provided in the call. The telephone 602 can also provide a data packet that is associated with the device or application that is the subject of the call. For example, if the device 610 is a particular model of television and has diagnosed an issue with a certain picture tube, then such information (device identifier and problem associated with the device) can be provided in a data packet to the recognizer component 102. This information can be relayed to the organization component 106, which can provide the caller with menu options relevant to the problem. Similarly, the user may have in their calendar that a bill is due for a certain service. The calendar application can indicate to the telephone 602 that the bill is due, and can provide a user of the telephone 602 an option of calling the appropriate customer service number. The user can depress a button or enter a voice command to contact the customer service number, and be identified by the recognizer component 102. The telephone 602 can also provide the recognizer component 102 with data relating to the call (e.g., the user wishes to pay their bill for a particular service). The organization component 106 can then utilize such information to selectively provide automated menu options or route the call to an appropriate human being.

In an example, the telephone 602 can be aware of a structure of menus offered by an automated telephone attendant that utilizes the organization component 106. For instance, the telephone 602 can be aware that the user desires (with respect to a default menu) a fourth option from a first set of available menu options, a third option from a second set of available options, and a first option from a first set of available options. With this knowledge, the telephone 602 can provide the organization component 106 with data that is structured such that the organization component 106 will have knowledge of what menu and/or order thereof to provide to the caller. In another example, the organization component 106 can analyze metadata provided by way of the telephone and can make intelligent decisions based at least in part upon the identity of the caller and/or the metadata. For example, a calendar application can have an entry to pay a certain bill, and the telephone 602 can provide such information within a packet of data to the recognizer component 102, which in turn can relay the data to the organization component 106. The organization component 106 can analyze the data packet and make an intelligent decision based upon the user's identity and content of the data packet with regard to providing the caller with menu options and ordering menu options.

Figure 7:
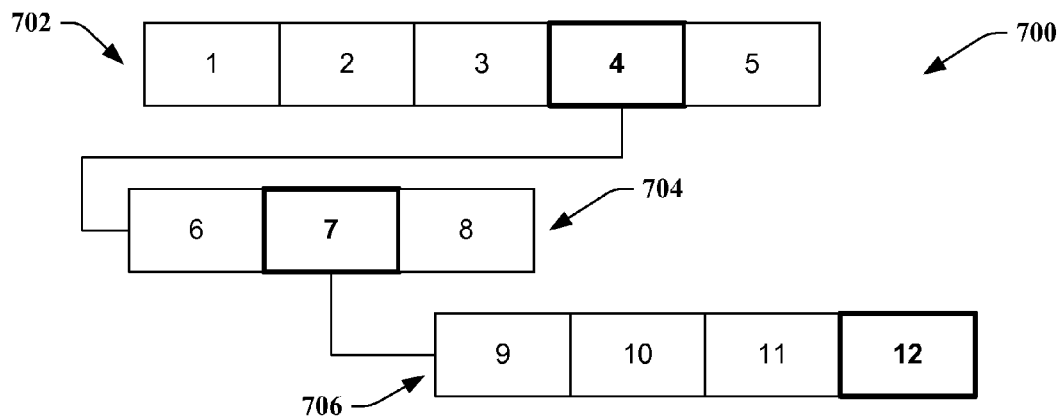
FIGS. 7-9 illustrate provision of a plurality of example menu options and traversal through the plurality of menu options.
Figure 8:
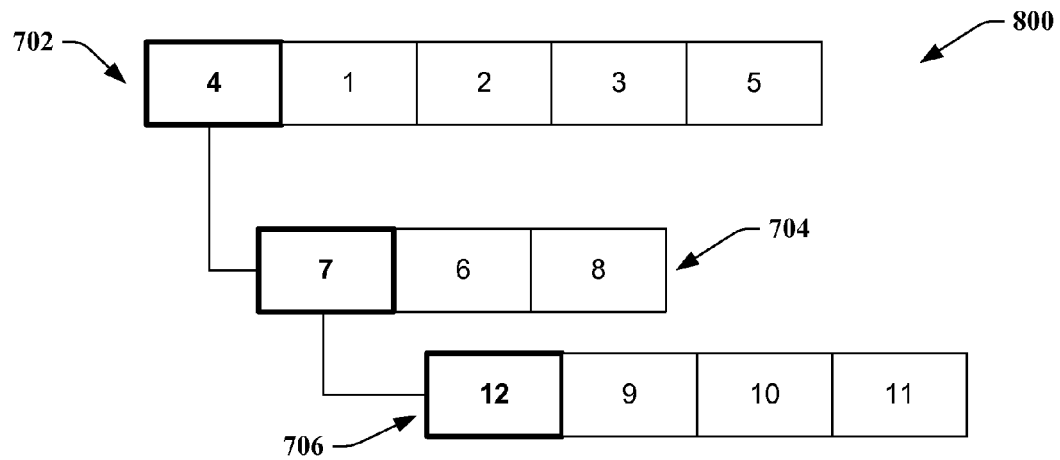
Figure 9:
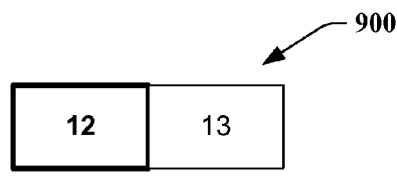

Now referring collectively to FIGS. 7-9, different traversals through menu options provided by an automated telephone attendant are illustrated. With reference specifically to FIG. 7, an example traversal of menu options 700 in accordance with a conventional provision of menu options to a caller is illustrated. More particularly, the example traversal 700 illustrates a default menu that is provided to all callers into a customer support telephone line. The caller can initially be provided with a first set of options 702 that includes five total options. The caller desires to select option four, but must wait while being provided with options one, two, and three. Upon selecting option four, the caller can be provided with a second set of menu options 704 that includes three possible options, wherein the caller selects option seven after being provided option six. Thereafter, the caller is provided with yet another set of menu options 706. Again, the caller must wait to hear several non-relevant options prior to being provided with a desired menu option (option twelve).

With respect to FIG. 8, an example traversal of the menus 800 through utilization of aspects described herein is illustrated. In this example (which is a corollary to the example described above), the user is again initially provided with the first set of options 702; however, the order of the provision of the options has been altered to accord to caller preference (as determined through examination of explicitly provided preferences or inferred through analysis of collected data). Thus, option four is initially provided to the caller, such that the caller need not be provided with several non-relevant options. At the second set of options 704, the user is initially provided with option seven, and upon selection of such option is provided with the third set of options 706. The user is then initially provided the desired final option (option twelve). Thus, rather than being forced to listen to ten options (as illustrated in FIG. 7), the caller is only provided with three desirable options.

Now turning to FIG. 9, an example provision of menu options 900 is illustrated. In this example, it is inferred that the user wishes to select option twelve, and thus options one through eleven are not provided to the caller. An option thirteen can be provided after option twelve, wherein option thirteen enables the caller to be provided with the default menu. Thus, in this example, the caller is directly provided with a menu option that is relevant (and is not forced to listen to non-relevant menu options).

Figure 10:
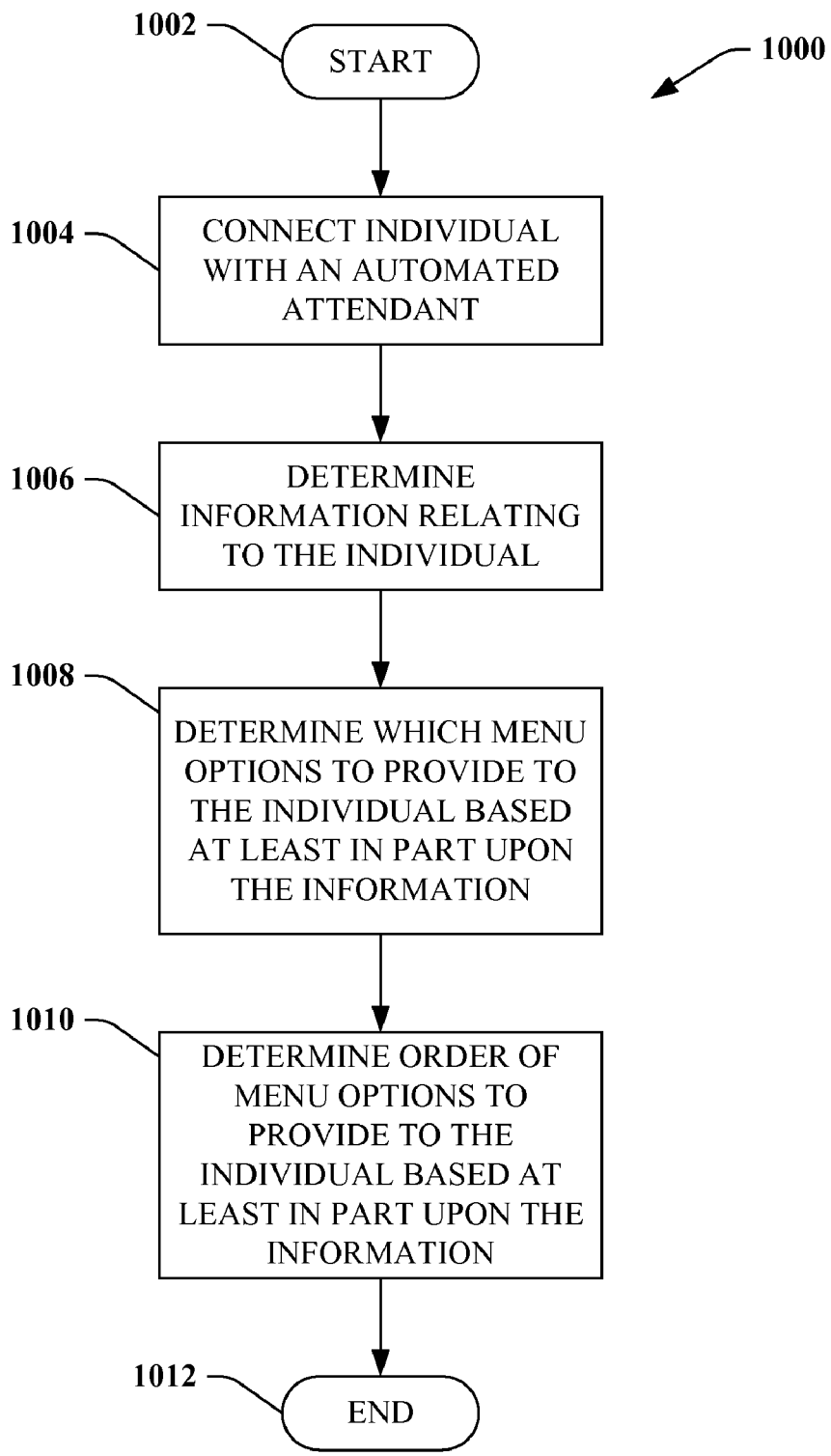
FIG. 10 is a representative flow diagram illustrating a methodology for determining automated menu options to provide to a caller as well as an order of the automated menu options.
Figure 11:
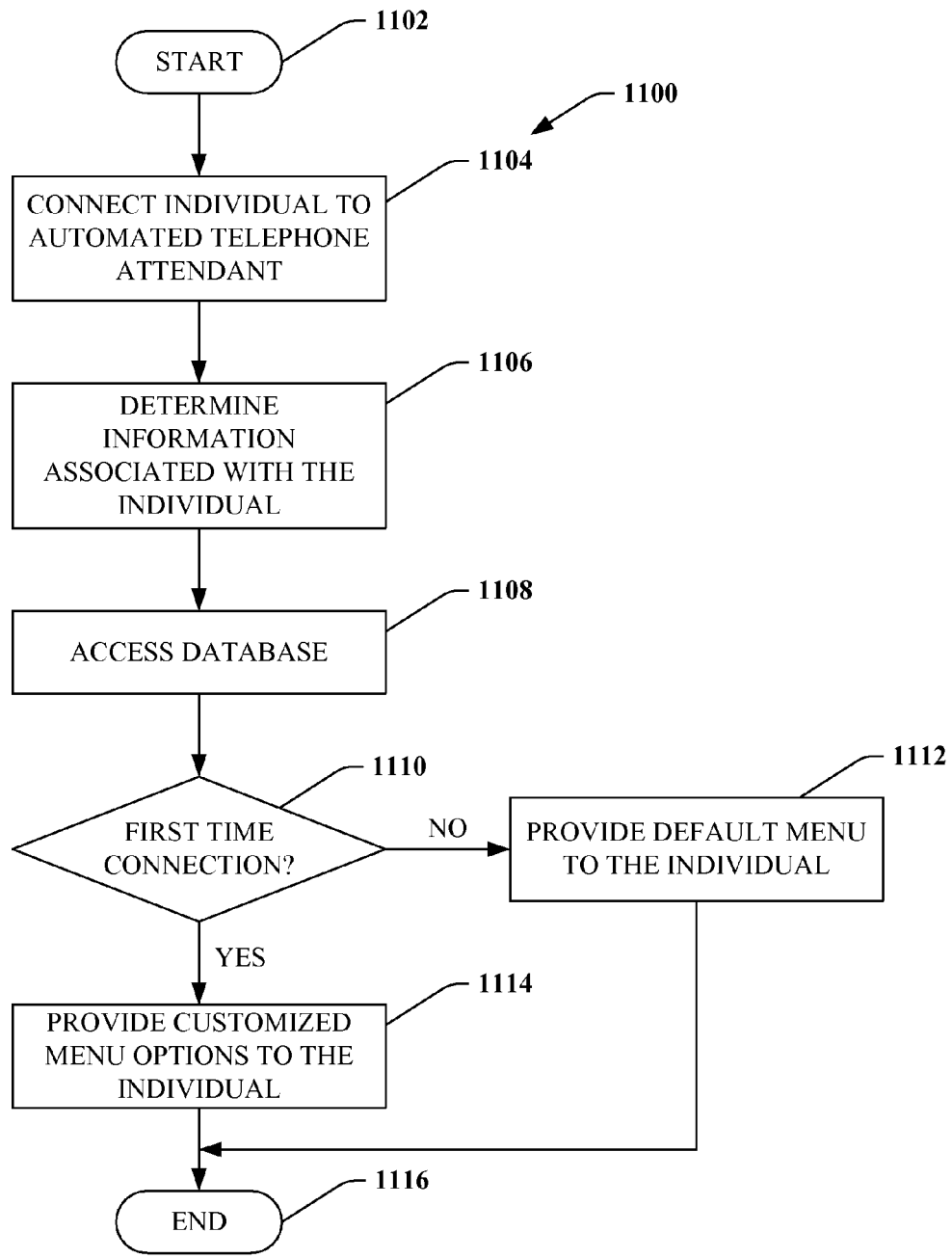
FIG. 11 is a representative flow diagram illustrating a methodology for determining whether to provide customized menu options to a caller or a default menu to the caller.
Figure 12:
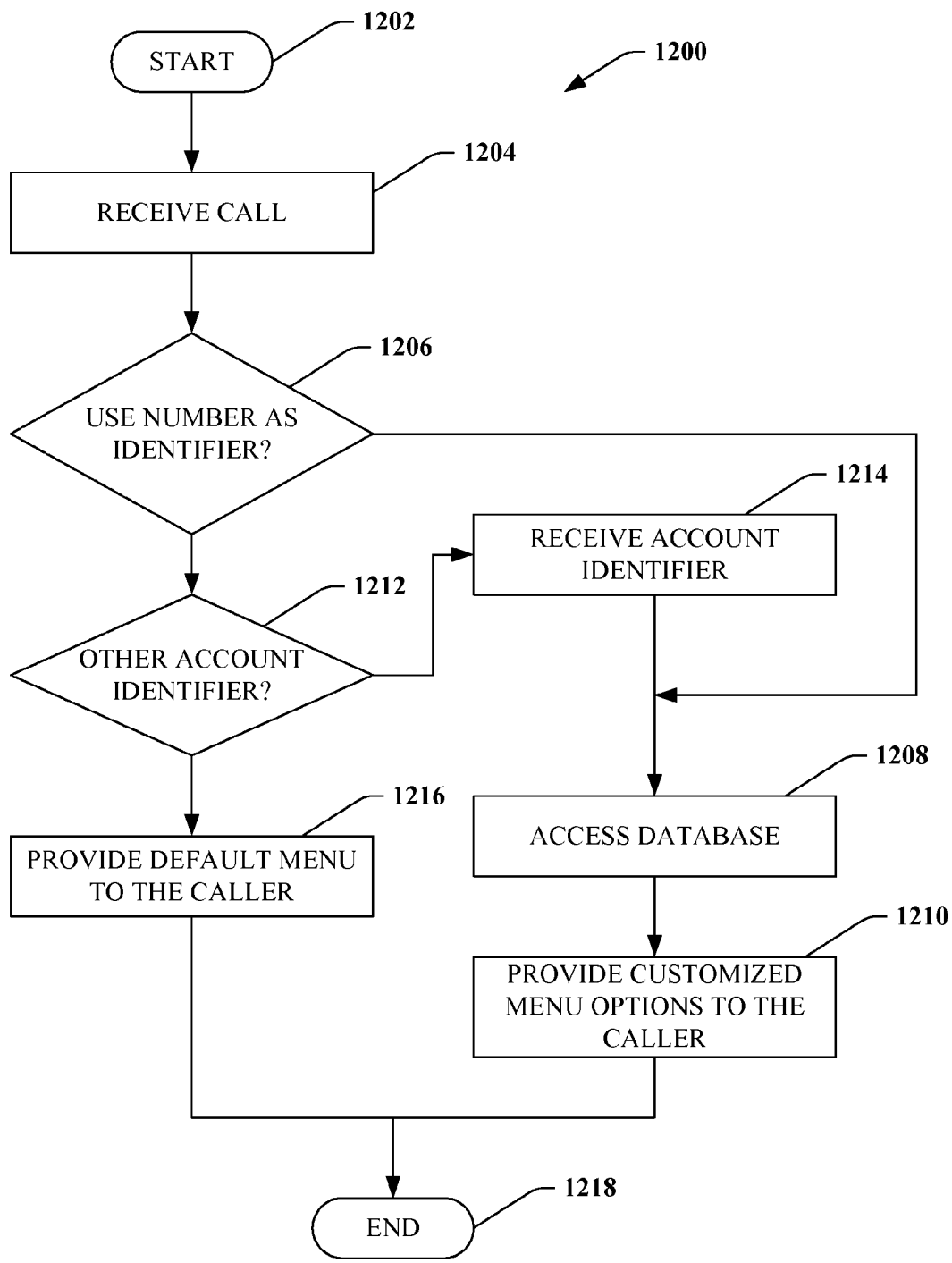
FIG. 12 is a representative flow diagram illustrating a methodology for utilizing contents of a database to determine preferences of a caller with respect to automated menu options.

Referring to FIGS. 10-12, methodologies in accordance with various aspects of the subject matter disclosed herein are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 10, a methodology 1000 for providing customized menu options to an individual who calls a customer service line or other suitable line that may be associated with an automated telephone attendant is illustrated. The methodology 1000 starts at 1002, and at 1004 an individual is connected with an automated telephone attendant. For example, the connection can be by way of a landline telephone, a mobile telephone, through "push-to-talk" technology, over VoIP, and/or the like. At 1006, information relating to the individual is ascertained. For instance, an identity of the individual can be determined through analysis of caller identification information, voice analysis, the individual providing an account number, username, password, personal identification number, biometric indicia, and/or the like.

Once the information related to the individual is determined, at 1008 a determination can be made regarding which menu options to provide to the individual (based at least in part upon the determined information). Pursuant to an example, such determination can be made through use of self-learning techniques, where past behavior of the individual is utilized to determine which menu options to provide to the individual. Thus, menu options can be provided and/or modified based upon previous actions of the individual. Additionally, a pre-programmed technique can be utilized to determine which menu options to provide to the individual. Such pre-programmed menu options can be explicitly requested by the individual, for instance (e.g., through utilization of a web browser, instructions provided over a telephone, . . . ). Still further, pre-programmed options can be provided depending upon a type of phone an individual is using, whether an individual is an employee of a company, a home location of the individual, and/or the like. For instance, if the individual uses a certain telephone to contact a customer service line, then pre-programmed menu options can be provided to such caller.

In still another example, user inputs can be utilized during a connection to optimize provision of menu options. For instance, the user can make a call to a customer service line and provide input by way of the telephone, Internet, and/or the like. User input can include information such as phone numbers used by the caller, commonly employed applications, job functions (such as retail sales, region, engineering, etc.) and other suitable information. Additionally or alternatively, any suitable combination of the above can be employed in connection with determining which menu options to provide to the individual. For instance, a self-learning approach can be combined with a pre-programmed approach to optimize menu options provided to the individual. Still further, even if the user has no history with the customer service line, demographics can be analyzed and employed to aid in determining which menu options to provide to the individual. For instance, males from a first geographic region can be provided with different menu options than females from a second geographic region.

At 1010, an order of menu options to provide to the individual is determined based at least in part upon the individual's identity. Techniques utilized in connection with selecting particular menu options can also be utilized with respect to ordering menu options (e.g., pre-programming, self-learning, a combination thereof, . . . ). The methodology 1000 then completes at 1012.

Now turning to FIG. 11, a methodology 1100 for providing customized menu options to an individual connected to an automated telephone attendant is illustrated. The methodology 1100 starts at 1102, and at 1104 an individual is connected with an automated telephone attendant. At 1106, an identity of the individual is determined, and at 1108 a database is accessed based at least in part upon the identity of the individual. For example, the database can include a list of individuals that have previously been connected with the customer service line, previously provided information relating to preferences with respect to menu options, and/or the like.

At 1110 a determination is made regarding whether the individual is a first-time caller (e.g., whether there is any information relating to the caller in the database). If the individual is a first time caller, then at 1112 a default menu is provided to the individual. Typically, most frequently selected menu options are presented first to the individual while other menu options are presented thereafter. If the individual is not a first time caller, then at 1114 customized menu options (in a particular order) are provided to the individual based at least in part up the individual's identity and contents of the database. For instance, the database can include information such as an individual's calling history, payment history, time until an account is to expire, duration of time that the individual has been a customer, individual's profession, individual's job function, demographic information, historical selections, explicit user input, location data, data from sources such as employment records and/or customer records, different phone numbers of the caller, commonly used applications, and/or other suitable information. The methodology 1100 then completes at 1116.

Now referring to FIG. 12, a methodology 1200 for providing a caller who calls a line operated by an automated telephone attendant with customized menu options (type of options and order thereof) is illustrated. The methodology 1200 initiates at 1202, and at 1204 a call to the automated telephone attendant is received. At 1206, a determination is made regarding whether a number of the caller (identified through analysis of caller identification information) is to be used as an identifier of the caller. For example, a menu option can be provided asking the caller if they are calling with respect to an account associated with a particular number. If the number is to be used as an account identifier, then at 1208 a database that includes information relating to the caller is accessed, and at 1210 customized menu options are provided to the caller based upon the caller's identity and the contents of the database. Additionally, real-time information can be analyzed, such as time of the call, location of the caller, and the like in connection with providing customized menu options to the caller.

If the number associated with the call is not to be utilized as an account identifier (e.g., a caller is calling from a line that is not associated with such caller), then at 1212 a determination is made regarding whether another account identifier is to be employed to identify the caller (such as a username, password, personal identification number, etc.). If other account identifiers are to be employed, then at 1214 account identification information is received from the caller. Once provided information is authenticated, the database can be accessed at 1208 and customized menu options can be provided to the caller at 1210. If at 1212 another account identifier is not provided, then at 1216 a default menu is provided to the caller. The methodology 1200 then completes at 1218.

Figure 13:
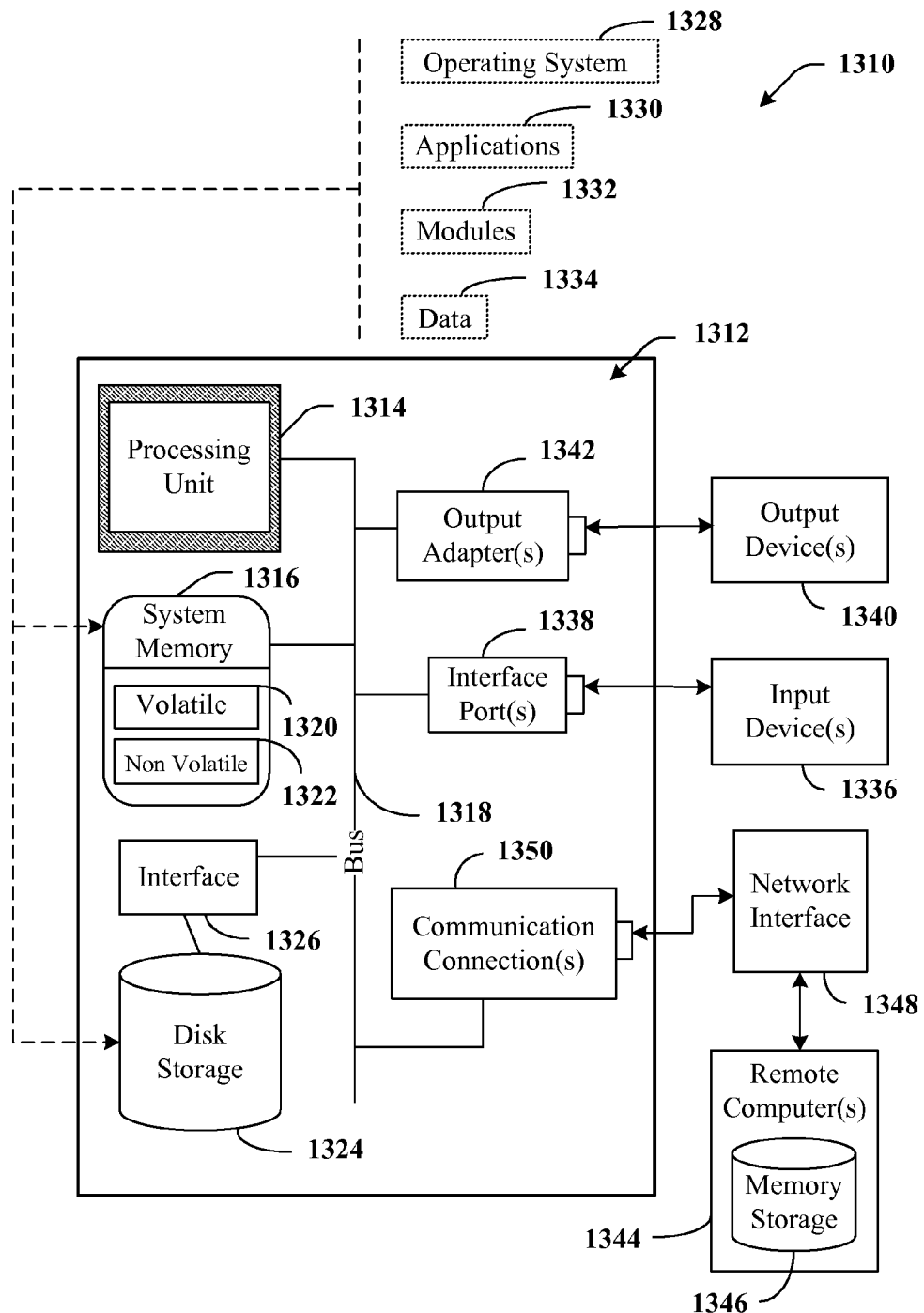
FIG. 13 is an example computing environment.

With reference to FIG. 13, an example environment 1310 for implementing various aspects of the aforementioned subject matter, including selectively ordering menu options provided by an automated telephone attendant, includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures as well as a programmable gate array and/or an application-specific integrated circuit (and other devices) also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and/or nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, secure digital, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), a Blue Ray Drive, or HD-DVD Drive. To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port, FireWire port, or other suitable port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
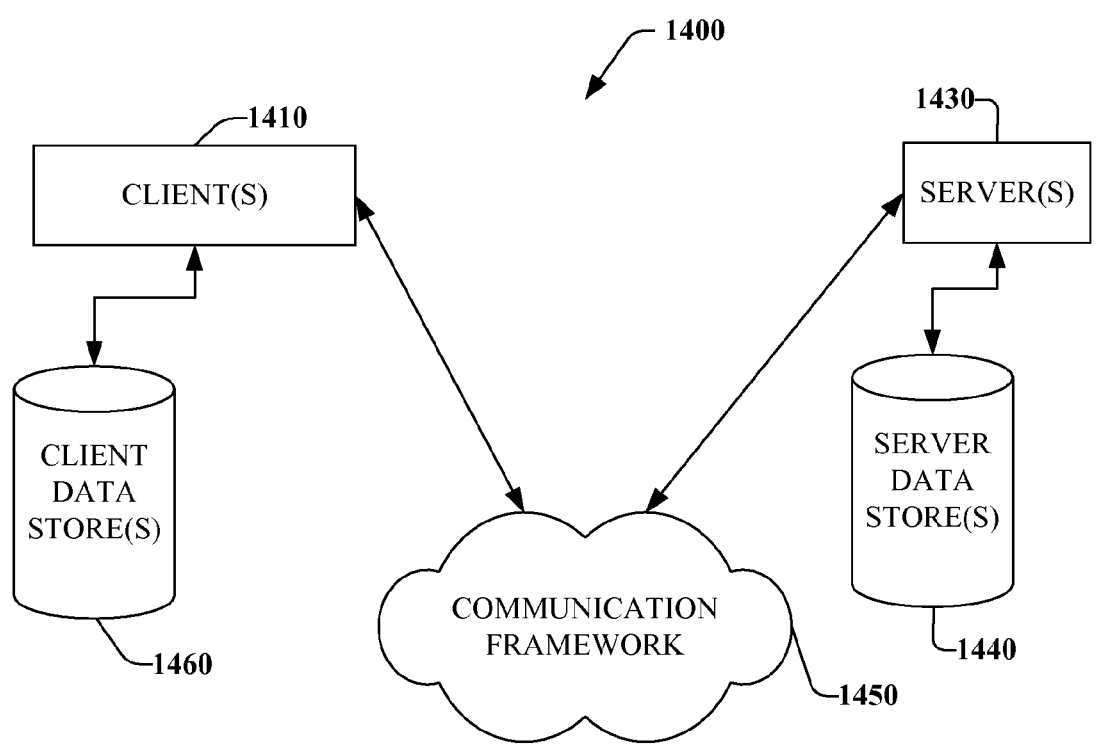
FIG. 14 is an example operating environment.

FIG. 14 is a schematic block diagram of a sample-computing environment 1400 with which the disclosed subject matter can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a recognizer component configured to determine information associated with a caller that is in contact with an automated telephone attendant;
    an analyzer component configured to obtain a set of system data characterized by demographic information relating to a demographic of the caller with respect to the automated attendant and a set of user-centric data associated with the caller, and infer a set of preferences based at least in part on the set of system data and the set of user-centric data; and
    an organization component configured to dynamically determine menu options to provide to the caller and an order of the menu options based at least in part upon the information associated with the caller and the set of preferences inferred by the analyzer component.

2. The system of claim 1, wherein the user-centric data includes a preference that has been explicitly received from the caller.

3. The system of claim 2, wherein the preference has been explicitly received from the caller via a web browser.

4. The system of claim 1, wherein the analyzer component is further configured to infer the set of preferences through utilization of machine learning.

5. The system of claim 1, further comprising a receiver component that is communicatively coupled to the analyzer component, wherein the receiver component is configured to acquire contextual data from a sensor, and the analyzer component is configured to infer the set of preferences based at least in part on the contextual data.

6. The system of claim 5, wherein the contextual data includes a current location of the caller, a time of day of the call, and a day of week of the call.

7. The system of claim 1, further comprising a voice analysis component configured to analyze a voice sample to determine an identity of the caller.

8. The system of claim 1, further comprising a query component configured to query the caller for identification information.

9. The system of claim 1, wherein the recognizer component utilizes caller identification information to determine an identity of the caller.

10. The system of claim 1, wherein the organization component is further configured to determine an advertisement to provide to the caller, while on hold, based at least in part on an identity of the caller.

11. The system of claim 1, further comprising a collection component configured to retain menu option selections made by the caller for later utilization by the organization component.

12. The system of claim 1, wherein the organization component is further configured to receive a data packet that includes metadata relating to a purpose of the caller being in contact with the automated telephone attendant, and determine options to provide to the caller based at least in part upon an analysis of the metadata.

13. A method comprising:
- connecting an individual with an automated telephone attendant;
- determining information related to the individual in contact with the automated telephone attendant including determining an identity of the individual demographic information related to the individual;
- generating a set of data based on a plurality of previous individuals in contact with the automated telephone attendant, wherein the plurality of previous individuals have related demographic information within a predetermined range of the demographic information related to the individual;
- inferring a set of preferences for the individual based at least in part on the demographic information related to the individual and the set of data based on the plurality of previous individuals; and
- dynamically determining a set of menu options based at least in part on the set of preferences.

14. The method of claim 13, further comprising:
- accessing a data storage that maintains a set of explicitly received preferences from the individual with respect to menu options; and
- utilizing the set of explicitly received preferences in connection with dynamically determining the set of menu options.

15. The method of claim 13, further comprising:
- accessing a data storage that maintains caller history;
- inferring the set of preferences for of the individual based at least in part on utilization of machine learning techniques over contents of the data storage; and
- utilizing the set of preferences in connection with dynamically determining the set of menu options.

16. The method of claim 13, further comprising:
- receiving contextual data associated with the individual; and
- determining the menu options based at least in part on the contextual data.

17. The method of claim 13, further comprising determining an identity of the individual through analyzing a voice sample of the individual.

18. The method of claim 13, further comprising determining that the individual has not previously been connected with the automated telephone attendant, and in response to the individual not previously being connected with the automated telephone attendant, providing the individual with a default menu.

19. A computer readable storage medium comprising computer executable instructions that, in response to execution by a computing system, cause the computing system to perform operations, comprising:
- determining an identity of a caller into a customer service line;
- obtaining data associated with the caller from a data store, wherein the data includes a set of demographic information associated with the caller;
- selecting a set of previous callers to the customer service line that have demographic information within a predetermined threshold of the set of demographic information associated with the caller;
- compiling a set of usage data for the set of previous callers;
- inferring a set of preferences for the caller based at least in part on the data associated with the caller and the set of usage data for the set of previous callers;
- obtaining a set of explicit preferences from the caller; and
- automatically determining menu options to provide to the caller and an order of the menu options based at least in part on the set of preferences and the set of explicit preferences.

20. The system of claim 19, further comprising receiving contextual data and automatically determining the menu options to provide to the caller and the order of the menu options based at least in part on the set of preferences, the set of explicit preferences, and the contextual data.

21. The system of claim 20, wherein the contextual data includes data relating to a telephone location.

22. The system of claim 19, wherein determining the identity of the caller includes indentifying the caller as a communication enabled automobile.

* * * * *